126,504

UNITED STATES PATENT OFFICE.

THORNTON R. WALKER, OF TYMOCHTEE, OHIO.

IMPROVEMENT IN THE MANUFACTURE OF SOAP.

Specification forming part of Letters Patent No. 126,504, dated May 7, 1872.

*To all whom it may concern:*

Be it known that I, THORNTON R. WALKER, of Tymochtee, in the county of Wyandot and State of Ohio, have invented a new and useful Improvement in Soap; and I do hereby declare that the following is a full, clear, and exact description thereof, which will enable others skilled in the art to make and use the same.

My invention has for its object to furnish, and consists in, an improved soap formed of the ingredients hereinafter mentioned.

In preparing my improved soap, I combine with each other the following ingredients: The product of the action of sulphuric acid upon tupentine; the product of the action of nitric acid upon turpentine; the product of the action of muriatic acid upon turpentine; the product of the action of heat upon turpentine at a temperature of from 200° to 250° centigrade; caoutchoucin; the product of the action of nitric acid upon benzine; the product obtained by warming benzine with nitric and sulphuric acids; the product of the action of muriatic acid upon benzine; the product of the action of nitric acid upon "rose burning-fluid," also called "rose-oil"—a hydrocarbon; the product of the action of muriatic acid upon "rose burning-fluid;" the product of the action of nitric and sulphuric acids upon "rose burning-fluid;" the product of the action of turpentine upon benzine; the product of the action of turpentine upon rose burning-fluid; the product of the action of sulphuric acid upon a mixture of turpentine and benzine; the product of the action of sulphuric acid upon a mixture of turpentine and rose burning-fluid; the product of the action of nitric acid upon a mixture of turpentine and benzine; the product of the action of nitric acid and rose burning-fluid upon a mixture of turpentine; petroleum; naphtha; the product of the action of nitric acid upon petroleum; the product of the action of nitric and sulphuric acids upon petroleum; the product of the action of nitric acid upon naphtha; the product of the action of nitric and sulphuric acids upon naphtha; the product of the action of a mixture of nitric acid and sulphuric acids upon a mixture of naphtha and petroleum; the product of the action of nitric acid upon a mixture of petroleum and benzine; the product of the action of nitric acid upon a mixture of petroleum and rose burning-fluid; the product of the action of nitric acid upon a mixture of naphtha and benzine; the product of the action of nitric acid upon a mixture of naphtha and rose burning-fluid; the product of the action of nitric acid upon a mixture of naphtha and turpentine; the product of the action of nitric acid upon a mixture of petroleum and turpentine; the product of the action of a mixture of nitric and sulphuric acids upon a mixture of turpentine and petroleum; the product of the action of a mixture of nitric and sulphuric acids upon a mixture of naphtha and benzine; the product of the action of a mixture of nitric and sulphuric acids upon a mixture of rose burning-fluid and petroleum; the product of the action of a mixture of nitric and sulphuric acids upon a mixture of benzine and petroleum; the product of the action of a mixture of nitric and sulphuric acids upon a mixture of naphtha and rose burning-fluid; the product of the action of a mixture of nitric and sulphuric acids upon a mixture of naphtha and turpentine; the product of the action of a mixture of nitric and sulphuric acids upon a mixture of turpentine and benzine; the product of the action of a mixture of nitric and sulphuric acids upon a mixture of turpentine and rose burning-fluid; the product of the action of a mixture of nitric and sulphuric acids upon a mixture of benzine and rose burning-fluid; the product of the action of boron fluoride upon a mixture of turpentine and benzine.

These ingredients in whole or in part, and in any desired proportions, are combined with each other to form a soap in the ordinary manner of soap-making.

In the use of sulphuric acid in preparing any product, I use about three-fourths of an ounce to the gallon of other fluid mentioned. In the use of nitric acid or muriatic acid, I use about one-half ounce to the gallon of other fluid mentioned. In the action of one of the fluids mentioned upon another, as for instance that of turpentine on benzine, equal parts of each are used. In mixing acids, I take of sulphuric acid two parts and of other acids mentioned one part. In mixing the fluids mentioned, such as benzine, naphtha, petroleum, rose burning-fluid, &c., as aforementioned, equal parts of each are used. In combining a mixture of acids with a mixture of the fluids mentioned, I use about five-eighths of an ounce of mixed acid per one gallon of the mixed fluids. The acids are mixed in carboys, or any other suitable vessels, and are ready for use as soon as mixed. The fluids spoken of may be mixed in barrels or any thing else suitable. The acids and fluids mentioned, from which the products are obtained, may be mixed in barrels or holders of any kind. In the action of an acid or mixture of acids on a fluid or mixture of fluids in barrel or other vessel, the product is decanted, except the acid residue in the bottom, which must not be withdrawn with the rest of the fluid, nor used in the making of soap. In obtaining the product of boron fluoride, equal parts of the fluids spoken of are mixed in a barrel, or something suitable, into the bottom of which is introduced or set a short porcelain tube, closed at the lower end, and containing four ounces (by weight) of vitrified boric oxide, and eight ounces of fluor-spar, into which, by means of a glass-tube, is slowly introduced forty-eight ounces (all by weight) of oil of vitriol. After standing for about twenty-four hours, the liquid-product is then drawn off, except a little residue in the bottom. In making any of the products, as before stated, they should stand about twenty-four hours before being decanted. The preparation of caoutchoucin is well known, and it is prepared—(Fown's Chemistry, page 491)—by the dry or destructive distillation of caoutchouc. In making my soap, I combine with one gallon of soap four ounces of any number of the substances mentioned—that is, if I should use but one, I should use four ounces, and if I should use forty of the substances or products mentioned, the sum of equal quantities of each would amount to four ounces. Although I generally prepare the soap and ingredients as aforesaid, yet they may all be prepared in any proportions that may happen to suit the manufacturer. I at present regard the foregoing as being the best method of procedure, all things considered.

I combine with one gallon of soap two ounces of the product of sulphuric acid and turpentine, one ounce of the product of nitric acid and benzine, one ounce of the product of the action of nitric acid on "rose burning-fluid." I combine with one gallon of turpentine, three-fourths ounce sulphuric acid; with benzine, one-half ounce nitric acid; with "rose burning-fluid," one-half ounce of nitric acid. The above carbon oils are subjected to the action of the acids for a period of about three days, when all the product is ready for use, except a small acid residue which settles to the bottom. During the three days that the chemical change is going on in the carbon oils, they should be stirred or shaken two or three times, to facilitate the combination. The acid residue which is at the bottom must not be used, as it would cause the decomposition of an equivalent quantity of soap. The above products are thoroughly combined with the soap in the above proportions.

Having thus described my invention, what I claim as new, and desire to secure by Letters Patent, is—

An improved soap formed of the above-mentioned ingredients, in whole or in part, substantially as herein set forth.

THORNTON R. WALKER.

Witnesses:
CRAWFORD KEAR,
JOSEPH H. SWERLEIN.